United States Patent
Jung et al.

(10) Patent No.: US 10,422,582 B2
(45) Date of Patent: Sep. 24, 2019

(54) MOLTEN IRON MANUFACTURING APPARATUS AND MOLTEN IRON MANUFACTURING METHOD

(71) Applicant: POSCO, Pohang-si (KR)

(72) Inventors: Jonghwun Jung, Pohang-si (KR); Won Namkung, Pohang-si (KR); Minyoung Cho, Pohang-si (KR); Sang-Ho Yi, Pohang-si (KR); Jong-Soo Woo, Pohang-si (KR)

(73) Assignee: POSCO, Pohang-Si (KR)

( * ) Notice: Subject to any disclaimer, the term of this patent is extended or adjusted under 35 U.S.C. 154(b) by 635 days.

(21) Appl. No.: 14/654,913

(22) PCT Filed: Dec. 28, 2012

(86) PCT No.: PCT/KR2012/011714
§ 371 (c)(1),
(2) Date: Jun. 23, 2015

(87) PCT Pub. No.: WO2014/104438
PCT Pub. Date: Jul. 3, 2014

(65) Prior Publication Data
US 2015/0345870 A1    Dec. 3, 2015

(30) Foreign Application Priority Data
Dec. 27, 2012    (KR) .................. 10-2012-0154103

(51) Int. Cl.
F27D 17/00    (2006.01)
C21B 13/00    (2006.01)
(Continued)

(52) U.S. Cl.
CPC ............ *F27D 17/004* (2013.01); *C21B 5/003* (2013.01); *C21B 13/004* (2013.01);
(Continued)

(58) Field of Classification Search
CPC . C21B 13/00; C21B 13/0073; C21B 13/0086; C21B 13/143; C21B 13/146; C21B 5/003; F27D 17/004
(Continued)

(56) References Cited

U.S. PATENT DOCUMENTS 6,152,984 A * 11/2000 Drnevich ............ C21B 13/0073
266/160
6,519,942 B2 * 2/2003 Wintrell .................. F01K 25/14
60/39.12
(Continued)

FOREIGN PATENT DOCUMENTS

CN    1205743    1/1999
CN    102057060    5/2011
(Continued)

OTHER PUBLICATIONS

JP 408239708, Kazutya et al., Fluidized reduction method of powder iron ore, Sep. 17, 1196, 9 pages.*
(Continued)

*Primary Examiner* — Scott R Kastler
*Assistant Examiner* — Michael Aboagye
(74) *Attorney, Agent, or Firm* — Cantor Colburn LLP

(57) ABSTRACT

An apparatus for manufacturing molten iron includes: an iron ore-mixing/pre-reducing furnace receiving and mixing natural iron ore and oxidized iron ore to form a mixture, and heating or pre-reducing the mixture using a reaction gas to form a pre-heated or pre-reduced iron ore; an iron ore reduction furnace receiving the pre-heated or pre-reduced iron ore iron ore and reducing the pre-heated or pre-reduced iron ore using a reduction gas to form a reduced iron ore and produce the reaction gas; a molten gasification furnace receiving coal and the reduced iron ore and producing molten iron and the reduction gas; and an iron ore oxidizing-
(Continued)

burning furnace receiving part of the reduced iron ore discharged from the iron ore reduction furnace and oxidizing the received reduced iron ore to produce the oxidized iron ore. The oxidized iron ore is supplied to the iron ore-mixing/pre-reducing furnace.

4 Claims, 3 Drawing Sheets

(51) Int. Cl.
  *C21B 5/00* (2006.01)
  *C21B 13/14* (2006.01)
(52) U.S. Cl.
  CPC ...... *C21B 13/0073* (2013.01); *C21B 13/0086* (2013.01); *C21B 13/143* (2013.01); *C21B 13/146* (2013.01); *C21B 2100/24* (2017.05); *C21B 2100/62* (2017.05); *Y02P 10/136* (2015.11)
(58) Field of Classification Search
  USPC ............... 266/171, 172; 75/445, 446
  See application file for complete search history.

(56) References Cited

U.S. PATENT DOCUMENTS

| | | |
|---|---|---|
| 6,572,761 B2 | 6/2003 | Lyon |
| 7,404,942 B2 | 7/2008 | Sanfilippo et al. |
| 7,767,191 B2 | 8/2010 | Thomas et al. |
| 8,540,930 B2 * | 9/2013 | Kwon ............... C21B 13/002 266/176 |
| 8,709,128 B2 * | 4/2014 | Knop ............... C21B 13/0073 75/392 |
| 2010/0050654 A1 | 3/2010 | Chiu et al. |
| 2011/0138965 A1 | 6/2011 | Boehm et al. |
| 2011/0284800 A1 | 11/2011 | Millner |
| 2012/0006158 A1 | 1/2012 | Drnevich et al. |

FOREIGN PATENT DOCUMENTS

| | | | |
|---|---|---|---|
| CN | 102119229 | 7/2011 | |
| CN | 102409124 | 4/2012 | |
| CN | 102586527 | 7/2012 | |
| GB | 2065709 | 7/1981 | |
| JP | 62230924 | 10/1987 | |
| JP | 408239708 | * 9/1996 | ........... C12B 13/004 |
| JP | 2007291452 | 11/2007 | |
| KR | 1019910008142 | 10/1991 | |
| KR | 1019990067315 | 8/1999 | |
| KR | 100244929 | 3/2000 | |
| KR | 1020100078327 | 7/2010 | |
| WO | 2010079050 | 7/2010 | |

OTHER PUBLICATIONS

International Search Report—PCT/KR2012/011714 dated Jul. 3, 2013.
L. S. Fan, Chemical Looping System for Fossil Energy Conversions, Wiley, 2010, pp. 35-37.
R. B. Gupta, Hydrogen Fuel, CRC Press, 2009, p. 61.

* cited by examiner

MOLTEN IRON MANUFACTURING APPARATUS AND MOLTEN IRON MANUFACTURING METHOD

TECHNICAL FIELD

The present invention relates to an apparatus for manufacturing molten iron and a method of manufacturing molten iron. More particularly, the present invention relates to an apparatus for manufacturing molten iron which processes an exhaust gas using a chemical looping process, and a method of manufacturing molten iron.

BACKGROUND ART

A steam-iron process for producing hydrogen from a gaseous fuel, which is a technology that was commercialized in the early 20th century, produces pure hydrogen through repeated redox using iron as a medium (R. B. Gupta, Hydrogen Fuel, CRC Press, 2009; L. S. Fan, Chemical Looping System for Fossil Energy Conversions, Wiley, 2010).

This technology is one of chemical looping processes in the early stage and does not require a water-gas shift reaction or a process of removing $CO_2$ in comparison to steam-methane reforming for mass production.

The steam-iron process has been developed to use a fixed-bed reactor or a fluidized-bed reactor, and efficiency of the chemical looping process is improved with development of technology regarding oxygen carrier particles using iron (Fe) as a basic substance, so it is used to separate undesired substances from a process exhaust gas.

Recently, rather than burning a mixture of air and fuel in a combustion process for producing power using fossil fuel, a method of burning them in an air-oxidation reaction and a fuel-reduction reaction using particles of a metal such as iron, nickel, and copper as a medium has been used, so an exhaust gas can be naturally separated. Further, this technology has been spotlight with respect to consuming a minimum cost for separating carbon dioxide.

In particular, as disclosed in Patent Documents (U.S. Pat. Nos. 6,572,761, 7,404,942, 7,767,191, 2010/0050654, and 2012/0006158), a chemical looping process that uses a gas fuel (natural gas, synthetic gas, and the like), a solid fuel (coal, coke, biomass, and the like), a liquid fuel, and a furnace exhaust gas as a fuel and that uses a metallic medium such as iron or $CaS/CaSO_4$ as oxygen carrier particles can both produce power using combustion, and separate carbon dioxide and produce hydrogen.

Iron used as oxygen carrier particles used in the documents is inexpensive and a large amount of iron is available for the steel industry, so the cost for obtaining it is low. Nevertheless, iron has a defect of poor activation over a long period of time in repeated redox, so porous oxygen carrier particles based on iron having a large surface area and shift efficiency are used.

Porous oxygen carrier particles have a support therein. Further, when solid fuel such as coal is used, ash, sulfur (S), and nitrogen oxides (NOx) should be separated.

However, those chemical looping processes are usually limited to a process of generating power using combustion, even though they use iron, which is widely used in the steel industry, as a medium.

The above information disclosed in this Background section is only for enhancement of understanding of the background of the invention and therefore it may include information that does not form the prior art that is already known in this country to a person of ordinary skill in the art.

DISCLOSURE

Technical Problem

The present invention has been made in an effort to provide an apparatus and a method of manufacturing molten iron which can efficiently remove carbon dioxide produced in a process of producing molten iron and can easily reduce hard-to-reduce iron ore.

Technical Solution

An exemplary embodiment of the present invention provides an apparatus for manufacturing molten iron that includes: an iron ore-mixing/pre-reducing furnace that receives and mixes natural iron ore and oxidized iron ore supplied from an iron ore oxidizing-burning furnace, and heats or pre-reduces iron ore using a flue gas supplied from an iron ore reduction furnace; the iron ore reduction furnace that receives pre-processed iron ore discharged from the iron ore-mixing/pre-reducing furnace or partially reduced iron ore, and reduces the iron ore using a reduction gas discharged from a molten gasification furnace; the molten gasification furnace that receives coal and some of reduced iron produced by the iron ore reduction furnace and produces molten iron and a reduction gas to be supplied to the iron ore reduction furnace; and the iron ore oxidizing-burning furnace that receives new iron ore and some of reduced iron discharged from the iron ore reduction furnace and changes the new iron ore into oxidized iron ore including a large amount oxygen by burning the new iron ore and the some of reduced iron with air.

The apparatus for manufacturing molten iron may further include a hydrogen producing device that produces hydrogen by reacting reduced iron, which is produced by the iron ore reduction furnace and supplied to the iron ore oxidizing-burning furnace, with steam, in which the reduced iron reacting with the steam may be supplied to the iron ore oxidizing-burning furnace.

The apparatus for manufacturing molten iron may further include a turbine that generates electricity using a gas discharged from the iron ore-mixing/pre-reducing furnace.

The apparatus for manufacturing molten iron may further include an exhaust gas processing device that changes carbon monoxide, which is in the gas discharged from the iron ore-mixing/pre-reducing furnace, into hydrogen.

The exhaust gas processing device may include a water-gas shift reactor and a hydrogen pressure swing adsorption ($H_2$ PSA).

The hydrogen producing device may be connected with a hydrogen supply line for supplying produced hydrogen to the iron ore reduction furnace.

Reduced iron put into the molten gasification furnace may be obtained from the new iron ore that is oxidized in the iron ore oxidizing-burning furnace and then reduced through the iron ore-mixing/pre-reducing furnace and the iron ore reduction furnace or from the natural iron ore that is reduced through the iron ore reduction furnace, supplied to the iron ore oxidizing-burning furnace to be used as a trigger, and then reduced.

Another exemplary embodiment of the present invention provides a method of manufacturing molten iron that includes: putting and mixing natural iron ore and oxidized iron ore, which is supplied from a iron ore oxidizing-burning furnace, in an iron ore-mixing/pre-reducing furnace, and heating or pre-reducing the iron ore with a flue gas supplied from an iron ore reduction furnace; putting pre-processed iron ore or partially reduced iron supplied from the iron ore-mixing/pre-reducing furnace into the iron ore reduction furnace, and reducing the iron ore with a reduction gas discharged from a molten gasification furnace; producing molten iron and a reduction gas to be supplied to the iron ore reduction furnace, by putting coal and some of reduced iron produced by the iron ore reduction furnace into the molten gasification furnace; and changing new iron ore into oxidized iron ore including a large amount of oxygen by putting the new iron ore and some of reduced iron discharged from the iron ore reduction furnace, into the oxidizing-burning furnace, and burning the new iron ore and the some of reduced iron with air.

The method may further include producing hydrogen by reacting some of reduced iron, which is discharged from the iron ore reduction furnace, with steam, in which the reduced iron ore reacting with the steam may be supplied to the iron ore oxidizing-burning furnace.

The method may further include generating electricity by passing a flue gas, which is discharged after heating or pre-reducing in the iron ore-mixing/pre-reducing furnace, through a turbine.

The method may further include changing carbon monoxide in a flue gas, which is discharged from the iron ore-mixing/pre-reducing furnace, into hydrogen by passing the flue gas through a water-gas shift reactor and a hydrogen pressure swing adsorption ($H_2$ PSA), and supplying the changed hydrogen to the iron ore reduction furnace.

Further, the method may further include supplying hydrogen produced by reaction between the reduced iron and the steam to the iron ore reduction furnace.

The natural iron ore that is put into the iron ore-mixing/pre-reducing furnace or the new iron ore that is put into the oxidizing-burning furnace may be provided together with $CaCO_3$ or $MgCO_3$.

Further, the method may further include generating electricity by passing a flue gas discharged from the iron ore oxidizing-burning furnace through the turbine.

Advantageous Effects

According to the present invention, it is possible to produce hydrogen by re-circulating reduced iron, separate carbon dioxide, and promote reduction of hard-to-reduce iron ore.

Further, since natural iron ore is used, there is no need for producing pre-processed oxygen carrier particles. Re-circulated reduced iron is used as a trigger for burning hard-to-reduce iron ore such as magnetite and used as a carrier for oxygen carrier particles and a trigger of a solid raw material in a chemical looping process, so it is possible to easily reduce hard-to-reduce iron ore.

MODE FOR INVENTION

Figure 1:
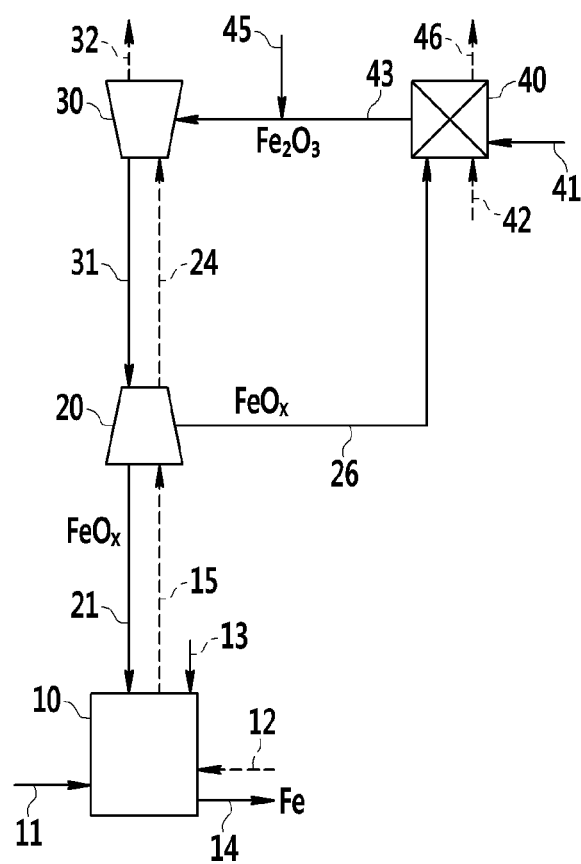
FIG. 1 is a diagram illustrating the configuration of an apparatus for manufacturing molten iron according to a first exemplary embodiment of the present invention.

Hereinafter, exemplary embodiments of the present invention will be described in detail with reference to the accompanying drawings so that those skilled in the art can easily achieve the present invention. The present invention may be implemented in various ways and is not limited to the exemplary embodiments described herein. Like reference numerals indicate like components in the specification and drawings.

FIG. 1 is a diagram of an apparatus for manufacturing molten iron according to an exemplary embodiment of the present invention.

Referring to FIG. 1, an apparatus 101 for manufacturing molten iron according to the present exemplary embodiment includes a molten gasification furnace 10, an iron ore reduction furnace 20, an iron ore-mixing/pre-reducing furnace 30, and an oxidizing-burning furnace 40.

The molten gasification furnace 10 is filled with coal and some of reduced iron reduced through the iron ore reduction furnace 20, and produces molten iron and a reduction gas to be supplied to the iron ore reduction furnace 20. A pulverized-coal supply line 11, an oxygen supply line 12, a coal supply line 13, and a first reduced iron supply line 21 are connected to the molten gasification furnace 10.

Air or oxygen is supplied into the molten gasification furnace 10 through the oxygen supply line 12, and pulverized coal is supplied into the molten gasification furnace 10 through the pulverized-coal supply line 11. Further, coal is supplied into the molten gasification furnace 10 through the coal supply line 13, and the first reduced iron supply line 21 is disposed between the molten gasification furnace 10 and the iron ore reduction furnace 20 and sends reduced iron produced through the iron ore reduction furnace 20 into the molten gasification furnace 10.

The reduced iron to be supplied into the molten gasification furnace 10 is supplied from the outside, and new iron ore including a large amount of natural magnetite can be supplied through the first reduced iron supply line 21 after being oxidized by air through the oxidizing-burning furnace 40 and reduced through the iron ore reduction furnace 20.

Further, the reduced iron may be obtained by heating and pre-reducing natural iron ore through the iron ore-mixing/pre-reducing furnace 30 and then reducing it through the iron ore reduction furnace 20.

Further, the reduced iron may be reduced through the iron ore reduction furnace 20 and some of the reduced iron may be used as an oxidation catalyst by the oxidizing-reducing furnace 40 and then supplied through the first reduced iron supply line 21 after passing through the iron ore-mixing/pre-reduction furnace 30 and the iron ore reduction furnace 20.

Further, a reduction gas supply line 15 connected to the iron ore reduction furnace 20 is connected to the molten gasification furnace 10, so a reduction gas produced by melting of iron ore is supplied into the iron ore reduction furnace 20 through the reduction gas supply line 15.

High heat of 1400° C. to 1600° C. and a reduction gas mainly including carbon monoxide and hydrogen are produced by combustion of oxygen, coal, and pulverized coal in the molten gasification furnace 10. The reduction gas supplies heat to the molten gasification furnace 10, removes oxygen from reduced iron, and reduces and melts the reduced iron. Accordingly, iron ore is divided into molten iron and slag. The slag is formed of gangue contained in the iron ore, ash contained in the coal and the pulverized-coal, and other materials. A molten iron discharge line 14 is connected to the molten gasification furnace 10 to discharge molten iron and slag.

Coal may be supplied as pre-coke, or briquette-type coal (coal briquettes) through pre-processing, and air can be supplied to the molten gasification furnace 10, but oxygen may be supplied to the molten gasification furnace 10 for easy separation of carbon dioxide from a reaction gas to decrease the carbon dioxide.

The iron ore reduction furnace 20 is a device that is filled with pre-processed iron ore or partially reduced iron discharged from the iron ore-mixing/pre-reducing furnace 30, and reduces iron ore using the reduction gas discharged from the molten gasification furnace 10.

An iron ore supply line 31 is connected between the iron ore-mixing/pre-reducing furnace 30 and the iron ore reduction furnace 20 to send iron ore from the iron ore-mixing/pre-reducing furnace 30 to the iron ore reduction furnace 20. Further, the reduction gas supply line 15 for supplying a high-temperature reduction gas produced through the molten gasification furnace 10 to the iron ore reduction furnace 20 is disposed between the molten gasification furnace 10 and the iron ore reduction furnace 20. Further, a reaction gas supply line 24 for supplying a reaction gas having reduction ability from the iron ore reduction furnace 20 to the iron ore-mixing/pre-reducing furnace 30 is connected to the iron ore reduction furnace 20 and the iron ore-mixing/pre-reducing furnace 30.

The high-temperature reduction gas supplied from the molten gasification furnace 10, which is produced by combustion of air or oxygen, coal, and pulverized coal, after reducing and melting iron ore, mainly includes carbon monoxide, hydrogen, carbon dioxide, or nitrogen, and small amounts of vapor, methane, and oxygen. Further, the reaction gas produced in the iron ore reduction furnace 20 includes a reductive gas component such as carbon monoxide and hydrogen.

As expressed in the following [Chemical Equation 1] and [Chemical Equation 2], iron ore changes from a state ($Fe_2O_3$, $Fe_3O_4$) including a large amount of oxygen into reduced iron ($FeO_x$, Fe) including a small amount of oxygen by reacting with a reduction gas in the iron ore reduction furnace 20. In this case, X is in the range of 0 to 1. Further, as expressed in [Chemical Equation 3], the reduction gas changes into carbon dioxide and water by a water-gas shift reaction. That is, carbon monoxide and hydrogen removes oxygen from iron ore and then changes into carbon dioxide and water vapor.

$$\tfrac{1}{3}Fe_2O_3 + CO/H_2 \rightarrow \tfrac{2}{3}Fe + CO_2/H_2O \qquad \text{[Chemical Equation 1]}$$

$$\tfrac{1}{4}Fe_3O_4 + CO/H_2 \rightarrow \tfrac{3}{4}Fe + CO_2/H_2O \qquad \text{[Chemical Equation 2]}$$

$$CO + H_2O \rightarrow CO_2 + H_2 \qquad \text{[Chemical Equation 3]}$$

A second reduced iron supply line 26 for supplying reduced iron to the iron ore oxidizing-burning furnace 40 is connected to the iron ore reduction furnace 20 and the iron ore oxidizing-burning furnace 40. Some of the iron ore reduced in the iron ore reduction furnace 20 is supplied to the iron ore oxidizing-burning furnace 40 through the second reduced iron supply line 26.

The circulation amount of the reduced iron supplied from the iron ore reduction furnace 20 to the iron ore oxidizing-burning furnace 40 can be flexibly adjusted, depending on the amount of hydrogen produced by a hydrogen producing device, the supply amount of new iron ore, and the supply amount of natural iron ore. That is, in order to produce a large amount of hydrogen, the supply amount of new iron ore is increased and the supply amount of natural iron ore to the iron ore oxidizing-burning furnace 40 is reduced, thereby increasing the production amount of hydrogen. Further, in order to increase the amount of natural iron ore to be supplied to the iron ore oxidizing-burning furnace 40, the productivity of molten iron is adjusted by adjusting the amount of recirculation of reduced iron by reducing the production amount of hydrogen and the supply amount of new iron ore.

Further, a first reduced iron supply line 21 for supplying reduced iron to the molten gasification furnace 10 is connected to the iron ore reduction furnace 20 and the molten gasification furnace 10. That is, some of reduced iron ore is supplied to the iron ore oxidizing-burning furnace 40 through the second reduced iron supply line 26, and the rest is supplied to the molten gasification furnace 10 through the first reduced iron supply line 21 and changed into molten iron.

The iron ore reduction furnace 20 may be a fixed-bed reactor, a moving bed reactor, or a fluidized-bed reactor. When reduced iron exists in the type of pellets or briquettes, the iron ore reduction furnace 20 is a fixed-bed reactor or a moving bed reactor, and when reduced iron exists in the type of pulverized-iron ore, it is a fluidized-bed reactor. The iron ore reduction furnace 20 may be composed of a plurality of reactors connected in series or in parallel.

The reaction temperature of the iron ore reduction furnace 20 may be 600° C. to 1000° C., and the reaction pressure of the iron ore reduction furnace 20 may be 10 bar or less at room temperature.

The iron ore-mixing/pre-reducing furnace 30 is a device that receives and mixes natural iron ore and oxidized iron ore supplied from the iron ore oxidizing-burning furnace 40, and heats or pre-reduces iron ore using a flue gas (supply gas) supplied from the iron ore reduction furnace 20.

Natural iron ore ($Fe_2O_3$) supplied from the outside and including a large amount of oxygen and oxidized iron ore ($Fe_2O_3$, $Fe_3O_4$) obtained from the iron ore oxidizing-burning furnace 40 are put into the iron ore-mixing/pre-reducing furnace 30 and mixed therein. Further, the iron ore-mixing/pre-reducing furnace 30 may have a drying furnace for removing moisture from natural iron ore.

An oxidized iron supply line 43 is connected between the oxidizing-burning furnace 40 and the iron ore-mixing/pre-reducing furnace 30 to supply oxidized iron from the oxidizing-burning furnace 40 to the iron ore-mixing/pre-reducing furnace 30. Further, an iron ore supply line 45 for supplying natural iron ore is connected to the oxidized iron supply line 43.

The iron ore oxidized in the iron ore oxidizing-burning furnace 40 is at a high temperature, is mixed with natural iron ore supplied from the outside, and is supplied to the iron ore-mixing/pre-reducing furnace 30. Since the oxidized iron ore from the iron ore oxidizing-burning furnace 40 is at a high temperature, it heats natural iron ore by being mixed with the natural iron ore.

A reaction gas supplied from the iron ore reduction furnace 20 through the reaction gas supply line 24 supplies heat to the iron ore-mixing/pre-reducing furnace 30, and carbon monoxide (CO) and hydrogen ($H_2$) (i.e., reductive gas components) change iron ore into reduced irons ($Fe_3O_4$, $FeO_x$) including a small amount of oxygen by separating oxygen from the iron ore. The reaction gas adjusts the heat in the iron ore-mixing/pre-reducing furnace 30 by enhancing mixing of natural iron ore and oxidized iron ore.

In the present exemplary embodiment, although it is exemplified that natural iron ore and oxidized iron ore are mixed and the mixture is supplied to the iron ore-mixing/pre-reducing furnace 30, the present invention is not limited thereto. When only high-temperature oxidized iron ore obtained from the oxidizing-burning furnace 40 is supplied without natural iron ore, the oxidized iron ore adjusts heat by coming in contact with a rising gas, and carbon monoxide (CO) and hydrogen ($H_2$) that are remaining reductive gases can enhance reduction ability for removing oxygen by acting on the iron ore.

A flue gas exhaust pipe 32 for discharging a flue gas produced by a reaction is connected to the iron ore-mixing/pre-reducing furnace 30. The flue gas discharged from the iron ore-mixing/pre-reducing furnace 30 can be used for generating power, and carbon dioxide may be kept or reused through an exhaust gas processing device.

Further, reduced iron produced in the iron ore-mixing/pre-reducing furnace 30 is supplied to the iron ore reduction furnace 20 through the iron supply line 31 connected to the iron ore-mixing/pre-reducing furnace 30 and the iron ore reduction furnace 20. Natural iron ore dried in the iron ore-mixing/pre-reducing furnace 30 is mixed with high-temperature oxidized iron ore having a temperature of 650° C. to 1100° C.

Oxidized iron ore supplied from the oxidizing-burning furnace 40 mainly includes $Fe_2O_3$ and $Fe_3O_4$. The iron ore supplied to the iron ore-mixing/pre-reducing furnace 30 receives heat from a reaction gas supplied from the iron ore reduction furnace 20, and carbon monoxide and hydrogen that are reductive gas components change the state of the iron ore into a state including a small amount of oxygen by removing oxygen from the iron ore. Further, the flue gas exhaust pipe 32 for discharging a produced flue gas is connected to the iron ore-mixing/pre-reducing furnace 30, and a turbine that generates power using the gas discharged from the iron ore-mixing/pre-reducing furnace 30 is disposed in the flue gas exhaust pipe 32.

The iron ore-mixing/pre-reducing furnace 30 may be a fixed-bed reactor, a moving bed reactor, or a fluidized-bed reactor, and when the iron ore-mixing/pre-reducing furnace 30 is a fluidized-bed reactor, it is possible to more uniformly mix natural iron ore with oxidized iron ore, using the reaction gas supplied from the iron ore reduction furnace 20.

The reaction temperature of the iron ore-mixing/pre-reducing furnace 30 is 350° C. to 750° C., depending on the iron ore reduction furnace 20, and the pressure of the iron ore-mixing/pre-reducing furnace 30 may be 10 bar or less at room temperature.

The oxidizing-burning furnace 40 is a device that receives natural magnetite or new iron ore and some of the reduced iron discharged from the iron ore reduction furnace 20, and changes the new iron ore into oxidized iron ore including a large amount oxygen by burning the magnetite and some of the reduced iron with air. The second reduced iron supply line 26 for supplying reduced iron to the iron ore oxidizing-burning furnace 40 from the iron ore reduction furnace 20 is connected to the iron ore oxidizing-burning furnace 40.

Further, an air supply line 42 for supplying air to the oxidizing-burning furnace 40 and a new iron ore supply line 41 for supplying new iron ore to the oxidizing-burning furnace 40 from the outside are connected to the oxidizing-burning furnace 40. The new iron ore to be supplied to the oxidizing-burning furnace 40 may be iron ore ($Fe_3O_4$) mainly including Fe at 60 wt % or more (FeO at 20 wt % or more) or Fe at 50 wt % or more (FeO at 10 wt % or more), gangue component such as $SiO_2$, $Al_2O_3$, CaO, and MgO at 10 wt % or 20 wt % or less, and the balance of $O_2$.

Further, the oxidized iron supply line 43 for supplying oxidized iron to the iron ore-mixing/pre-reducing furnace 30 and a flue gas exhaust line 46 for discharging a high-temperature flue gas produced in the oxidizing-burning furnace 40 are connected to the oxidizing-burning furnace 40.

The reduced iron supplied through the second reduced iron supply line 26 is burned with supplied air into oxidized iron, and the new iron ore supplied to the oxidizing-burning furnace 40 is heated by the heat generated in this process. Further, the heated new iron ore is burned by reacting with air and the burned new iron ore makes a chain reaction of changing into oxidized iron.

The supplied air may be high-temperature air at 900° C. or less, and air supplies oxygen for combustion to reduced iron and heated iron ore that function as triggers, and is discharged at a high temperature with less oxygen from a reactor.

The oxidizing-burning furnace 40 may be a fixed-bed reactor, a moving bed reactor, or a fluidized-bed reactor, and particularly, the oxidizing-burning furnace 40 may be a fluidized-bed riser reactor. When the oxidizing-burning furnace 40 is a riser reactor that is a kind of fluidized-bed reactors, it is advantageous for a chain combustion reaction of iron ore.

When the oxidizing-burning furnace 40 is a riser reactor, a trigger of a solid raw material generates heat by burning and intensively reacting with the oxygen in the air supplied from the lower end of the reactor, and changes new iron ore supplied from above the lower end of the reactor into a trigger by heating it.

The changed trigger of a solid raw material heats new iron ore that is continuously supplied through a riser reaction pipe while rising through the riser reaction pipe, generates a chain reaction for changing into a trigger, and is changed into oxidized iron having high-temperature heat.

The oxidizing-burning furnace 40 may include a plurality of reactors arranged in parallel. The processing temperature of the oxidizing-burning furnace 40 is maintained at 700° C. to 1200° C. such that new iron ore that is supplied is heated and oxidized, and the discharge flue gas generates electricity by passing through the turbine, in which the pressure of the reactor is around 30 bar at room temperature for efficient power generation. Pressure in this process may be controlled by compressed air that is supplied.

A method of manufacturing molten iron according to the present exemplary embodiment is described hereafter.

A method of manufacturing molten iron according to the present exemplary embodiment includes: putting and mixing natural iron ore and oxidized iron ore, which is supplied from the iron ore oxidizing-burning furnace 40, in the iron ore-furnace 30, and heating or pre-reducing the iron ore with a flue gas supplied from the iron ore reduction furnace 20; putting pre-processed iron ore or partially reduced iron supplied from the iron ore-mixing/pre-reducing furnace 30 into the iron ore reduction furnace 20, and reducing the iron ore with a reduction gas discharged from the molten gasification furnace; producing molten iron and a reduction gas to be supplied to the iron ore reduction furnace 20, by putting coal and some of reduced iron produced by the iron ore reduction furnace 20 into the molten gasification furnace 10; and changing new iron ore into oxidized iron ore including a large amount of oxygen, by putting the new iron ore and some of reduced iron discharged from the iron ore reduction furnace 20 into the iron ore oxidizing-burning furnace 40, and burning the new iron ore and the some of reduced iron with air.

The method of manufacturing molten iron according to the present exemplary embodiment may further include generating electricity by passing a flue gas, which is discharged after heating or pre-reducing in the iron ore-mixing/pre-reducing furnace 30, through a turbine.

Further, the method of manufacturing molten iron according to the present exemplary embodiment may further include generating electricity by passing a flue gas discharged from the iron ore oxidizing-burning furnace 40 through a turbine.

Figure 2:
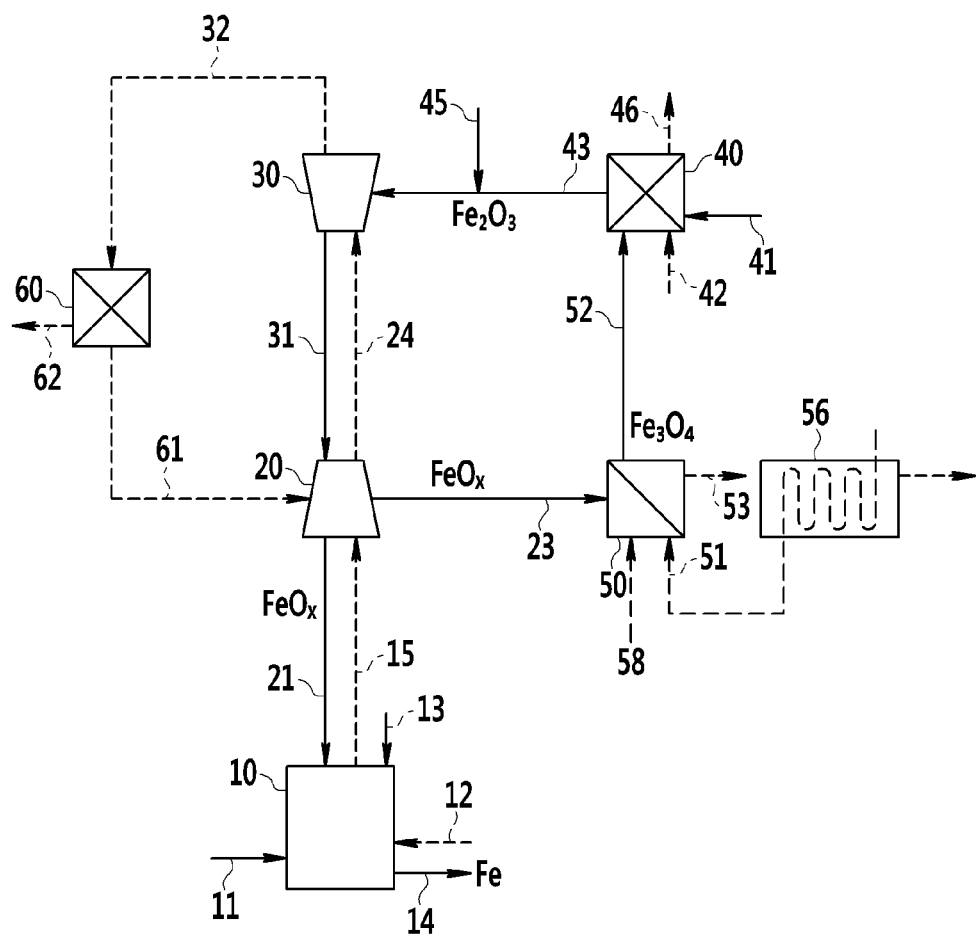
FIG. 2 is a diagram illustrating the configuration of an apparatus for manufacturing molten iron according to a second exemplary embodiment of the present invention.

FIG. 2 is a diagram illustrating the configuration of an apparatus for manufacturing molten iron according to a second exemplary embodiment of the present invention.

Referring to FIG. 2, an apparatus 102 for manufacturing molten iron according to a second exemplary embodiment of the present invention is the same in structure as the apparatus for manufacturing molten iron according to the first exemplary embodiment described above, except that an exhaust gas processing device 60 and a hydrogen producing device 50, so the same configuration is not described.

The hydrogen producing device 50 is a device that produces hydrogen by reacting reduced iron, which is produced by an iron ore reduction furnace 20 and supplied to an iron ore oxidizing-burning furnace 40, with steam.

The hydrogen producing device 50 is a device that produces hydrogen by reacting reduced iron, which is supplied from the iron ore reduction furnace 20, with steam through a catalyst. A third reduced iron supply line 23 connected to the iron ore reduction furnace 20 to receive the reduced iron produced by the iron ore reduction furnace 20 is connected to the hydrogen producing device 50. A steam supply line 51 for supplying steam, a hydrogen exhaust pipe 53, and a trigger supply line 52 for supplying a trigger produced in the hydrogen producing device 50 to the oxidizing-burning furnace 40 are connected to the hydrogen producing device 50.

The reduced iron ore supplied from the iron ore reduction furnace 20 produces hydrogen by causing an oxidation reaction with steam 58 through a catalyst and changes into a trigger by oxidizing. The steam 58 provides oxygen to reduced iron in the hydrogen producing device 50 and changes into hydrogen. The steam 58 may be supplied from the outside.

The hydrogen exhaust pipe 53 is connected to a heat exchanger 56, so steam produced by heat exchange of high-temperature hydrogen can supply steam to the hydrogen producing device 50 through the steam supply line 51.

The hydrogen producing device 50 may be a fixed-bed reactor, a moving bed reactor, or a fluidized-bed reactor. The reaction temperature of the hydrogen producing device 50 may be 600° C. to 1000° C., depending on the reduced iron supplied from the iron ore reduction furnace 20, and the reaction pressure of the hydrogen producing device 50 may be 30 bar or less at room temperature.

The trigger supplied to the iron ore oxidizing-burning furnace 40 through the trigger supply line 52 changes into oxidized iron by burning with air, in which new iron ore supplied to the iron ore oxidizing-burning furnace 40 is heated by the heat generated in this process. The heated new iron ore changes into a trigger and burns by reacting with air, and the burned new iron ore makes a chain reaction of changing into oxidized iron.

The exhaust gas processing device 60 is connected to the flue gas exhaust pipe 32 of the iron ore-mixing/pre-reducing furnace 30, and is a device for changing carbon monoxide, which is in the gas discharged from the exhaust gas processing device 60, into hydrogen. The exhaust gas processing device 60 may include a water-gas shift reactor and a hydrogen pressure swing adsorption. The exhaust gas processing device 60 can separate carbon dioxide and produce a reduction gas including hydrogen.

A carbon dioxide exhaust pipe 62 and a reduction gas supply line 61 are connected to the exhaust gas processing device 60. A gas including carbon dioxide in a high concentration discharged through the carbon dioxide exhaust pipe 62 may be kept under the ground or reused. The reduction gas supply line 61 is connected to the iron ore reduction furnace 20, and carries a reduction gas including a large amount of hydrogen to the iron ore reduction furnace 20.

In addition to the method of manufacturing molten iron according to the first exemplary embodiment described above, the method of manufacturing molten iron according to the present exemplary embodiment further includes producing hydrogen by reacting some of reduced iron discharged from the iron ore reduction furnace 20 with steam, in which the reduced iron reacting with the steam is supplied to the iron ore oxidizing-burning furnace 40.

The method of manufacturing molten iron according to the present exemplary embodiment further includes changing carbon monoxide in the flue gas, which is discharged from the iron ore-mixing/pre-reducing furnace 30, into hydrogen by passing the flue gas through a water-gas shift reactor and a hydrogen pressure swing adsorption ($H_2$ PSA), and supplying the changed hydrogen to the iron ore reduction furnace.

Figure 3:
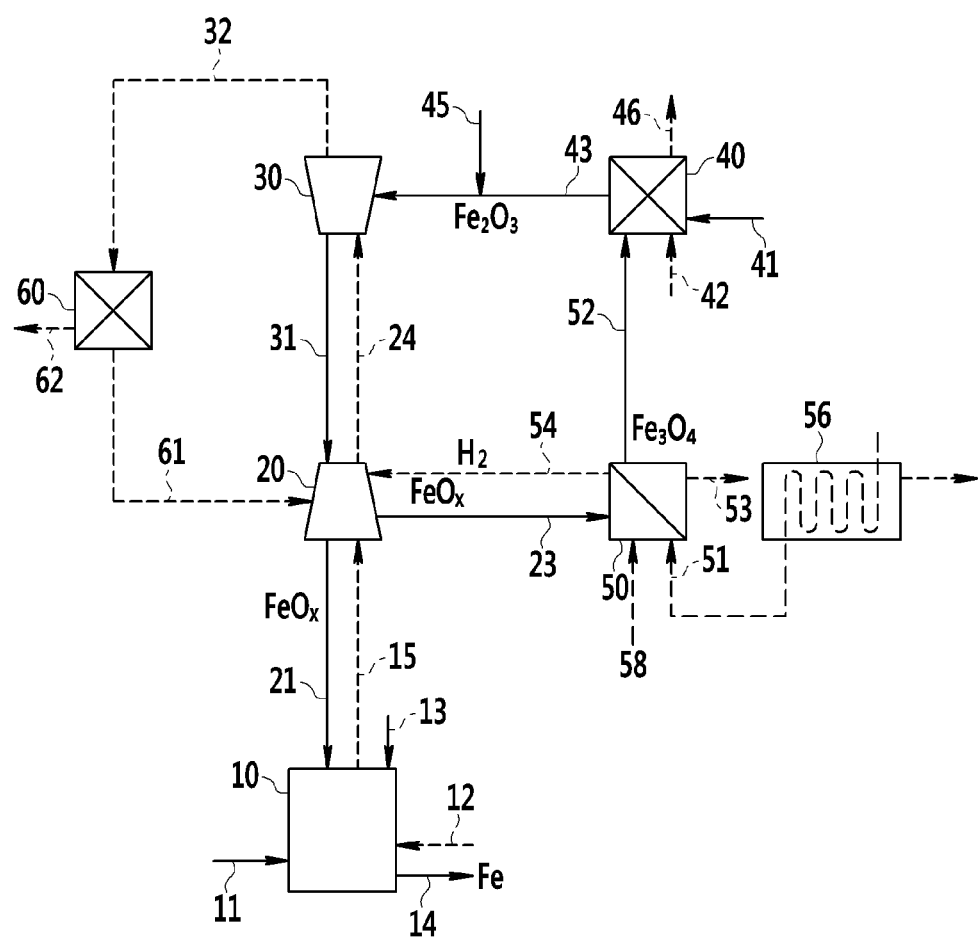
FIG. 3 is a diagram illustrating the configuration of an apparatus for manufacturing molten iron according to a third exemplary embodiment of the present invention.

FIG. 3 is a diagram illustrating the configuration of an apparatus for manufacturing molten iron according to a third exemplary embodiment of the present invention.

Referring to FIG. 3, an apparatus 103 for manufacturing molten iron according to a third exemplary embodiment of the present invention is the same in structure as the apparatus for manufacturing molten iron according to the second exemplary embodiment, except that a hydrogen supply line 54 is connected to the hydrogen producing device 50, so the same configuration is not described.

The hydrogen supply line is connected to the hydrogen producing device 50 and the iron ore reduction furnace 20, and supplies hydrogen produced by the hydrogen producing device 50 to the iron ore reduction furnace 20. When hydrogen is supplied to the iron ore reduction furnace 20, reduction ability is increased and iron ore can be more efficiently reduced, so a load on the molten gasification furnace 10 can be reduced.

When more molten iron needs to be produced or there is a need for reducing the amount of a reducer, hydrogen is supplied to the iron ore reduction furnace 20 through the hydrogen supply line 54, and in other cases, hydrogen is supplied to the outside. A sub-iron ore material such as calcium carbonate ($CaCO_3$) or magnesium carbonate ($MgCO_3$) may be additionally supplied with natural iron ore in order to supplement heat generated by the oxidizing-burning furnace 40 and easily separate slag and molten iron in the molten gasification furnace 10.

The calcium carbonate ($CaCO_3$) can be re-circulated while supplying heat by changing into calcium oxide (CaO) in the iron ore oxidizing-burning furnace 40 and enhancing reduction ability of a reduction furnace by recovering and filtering carbon dioxide in the iron ore-mixing/pre-reducing furnace 30 or the iron ore reduction furnace 20.

The method of manufacturing molten iron according to the present exemplary embodiment further includes supplying hydrogen produced by a reaction between reduced iron and steam to the iron ore reduction furnace, in addition to the method of manufacturing molten iron according to the second exemplary embodiment described above.

The natural iron ore that is put into the iron ore-mixing/pre-reducing furnace 30 or the new iron ore that is put into the iron ore oxidizing-burning furnace 40 is provided together with $CaCO_3$ or $MgCO_3$.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An apparatus for manufacturing molten iron, comprising:
    an iron ore-mixing/pre-reducing furnace that receives and mixes natural iron ore and oxidized iron ore to form a mixture of the natural iron ore and the oxidized iron ore, and heats or pre-reduces the mixture using a reaction gas having reduction ability to form a pre-heated or pre-reduced iron ore;
    an iron ore reduction furnace that receives the pre-heated or pre-reduced iron ore discharged from the iron ore-mixing/pre-reducing furnace and reduces the pre-heated or pre-reduced iron ore using a reduction gas to form a reduced iron ore and produce the reaction gas having reduction ability, wherein the reaction gas having reduction ability is supplied to the iron ore-mixing/pre-reducing furnace;
    a molten gasification furnace that receives coal and the reduced iron ore produced by the iron ore reduction furnace and produces molten iron and the reduction gas, wherein the reduction gas is supplied to the iron ore reduction furnace;
    an iron ore oxidizing-burning furnace that receives part of the reduced iron ore discharged from the iron ore reduction furnace and oxidizes the received reduced iron ore to produce the oxidized iron ore by burning the received reduced iron ore, wherein the oxidized iron ore is supplied to the iron ore-mixing/pre-reducing furnace; and
    a hydrogen producing device, wherein the part of the reduced iron ore passes through the hydrogen producing device and is supplied to the iron ore oxidizing-burning furnace, and the part of the reduced iron ore passing through the hydrogen producing device reacts with steam to produce hydrogen gas.

2. The apparatus of claim 1, further comprising: an exhaust gas processing device that receives carbon monoxide from the iron ore-mixing/pre-reducing furnace and produces carbon dioxide and hydrogen.

3. The apparatus of claim 2, wherein the exhaust gas processing device includes a water-gas shift reactor and a hydrogen pressure swing adsorption ($H_2$ PSA).

4. The apparatus of claim 2, wherein the hydrogen producing device includes a hydrogen supply line through which the hydrogen is supplied to the iron ore reduction furnace.

* * * * *